US008191974B2

(12) United States Patent
Offerle et al.

(10) Patent No.: US 8,191,974 B2
(45) Date of Patent: Jun. 5, 2012

(54) SYSTEM AND METHOD TO CONTROL HYDRAULIC PUMP TO PROVIDE STEERING AND BRAKING ASSIST

(75) Inventors: Timothy Offerle, Whittaker, MI (US); Brian D. Rutkowski, Ypsilanti, MI (US); Mujeeb Ijaz, Leonard, MI (US); Ken Jackson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1010 days.

(21) Appl. No.: 11/381,910

(22) Filed: May 5, 2006

(65) Prior Publication Data

US 2007/0257550 A1 Nov. 8, 2007

(51) Int. Cl.
*B60T 13/18* (2006.01)
*B60T 15/14* (2006.01)

(52) U.S. Cl. ............... 303/11; 303/7; 303/15; 303/191

(58) Field of Classification Search ............... 303/3, 7, 303/10, 11, 15, 191, 20, 114.1; 180/405
See application file for complete search history.

(56) References Cited

U.S. PATENT DOCUMENTS

| 3,023,639 A * | 3/1962 | Weinrich et. al. ............... 475/49 |
| 3,795,423 A * | 3/1974 | Shields et al. ............... 303/9.73 |
| 4,074,528 A | 2/1978 | Lourigan et al. |
| 4,154,262 A | 5/1979 | Blume et al. |
| 4,199,946 A * | 4/1980 | Wilson et al. ............... 60/547.3 |
| 4,420,290 A | 12/1983 | Drutchas |
| 4,549,566 A * | 10/1985 | Fujiwara et al. ......... 137/115.09 |
| 4,557,342 A | 12/1985 | Drutchas |
| 4,586,581 A * | 5/1986 | Shibahata et al. ............. 180/415 |
| 4,999,776 A * | 3/1991 | Soltis et al. ..................... 701/41 |
| 5,067,577 A * | 11/1991 | Morishita ..................... 180/412 |
| 5,179,835 A | 1/1993 | Casey et al. |
| 5,346,289 A * | 9/1994 | Cords et al. ....................... 303/7 |
| 5,398,184 A * | 3/1995 | Yamaoka et al. ............... 701/82 |
| 5,505,527 A * | 4/1996 | Gray et al. ......................... 303/3 |
| 5,540,203 A | 7/1996 | Foulkes et al. |
| 5,549,361 A | 8/1996 | Sorensen |
| 5,713,429 A * | 2/1998 | Doolittle ....................... 180/423 |
| 5,836,347 A | 11/1998 | Harries |
| 6,101,435 A * | 8/2000 | Baughn et al. .................. 701/41 |

(Continued)

FOREIGN PATENT DOCUMENTS

CN 1134133 A 10/1996

(Continued)

OTHER PUBLICATIONS

German Communication for Application No. 10 2007 016 112.5-51, Dr. rer. net. Hofmann, Jun. 26, 2008, 5 pages, Munich, Germany.

*Primary Examiner* — Melody Burch
(74) *Attorney, Agent, or Firm* — Fredrick Vernon Owens; Alleman Hall McCoy Russell & Tuttle LLP

(57) ABSTRACT

A method to control a hydraulic pump of a vehicle, the pump coupled to at least a power steering system and a power braking system is provided. The method comprises measuring steering and braking information using a brake sensor and a steering sensor; and adjusting output of said hydraulic pump based on measured information from said sensors.

10 Claims, 5 Drawing Sheets

U.S. PATENT DOCUMENTS

| | | | |
|---|---|---|---|
| 6,173,223 | B1 | 1/2001 | Liubakka et al. |
| 6,179,389 | B1 | 1/2001 | Freitag et al. |
| 6,276,136 | B1 * | 8/2001 | Oishi et al. .................. 60/547.1 |
| 6,318,817 | B1 * | 11/2001 | Martin et al. ............. 303/116.1 |
| 6,463,378 | B2 | 10/2002 | Nishio |
| 6,498,973 | B2 | 12/2002 | Dix et al. |
| 6,588,855 | B2 * | 7/2003 | Harris ............................ 303/20 |
| 6,595,598 | B2 | 7/2003 | Harris et al. |
| 6,955,406 | B2 * | 10/2005 | Blue ................................ 303/7 |
| 2002/0063469 | A1 * | 5/2002 | Nishio .............................. 303/4 |
| 2002/0180258 | A1 | 12/2002 | Davison et al. |
| 2003/0075975 | A1 * | 4/2003 | Fulks et al. ................ 303/113.4 |
| 2003/0234135 | A1 | 12/2003 | Gaunt et al. .................. 180/417 |
| 2004/0098984 | A1 | 5/2004 | Duell et al. |
| 2006/0259221 | A1 * | 11/2006 | Murty et al. .................... 701/41 |

FOREIGN PATENT DOCUMENTS

| | | |
|---|---|---|
| CN | 1451574 A | 10/2003 |
| DE | 19825204 | 3/2000 |
| DE | 10147351 | 6/2002 |

* cited by examiner

SYSTEM AND METHOD TO CONTROL HYDRAULIC PUMP TO PROVIDE STEERING AND BRAKING ASSIST

FIELD

The present application relates to system and method to control a hydraulic pump of a vehicle to provide for both steering and braking assist function.

BACKGROUND AND SUMMARY

Motor vehicles may use a single power steering pump to provide both steering and braking assist, where the pump regulates hydraulic flow and limits pressure to ensure that steering and braking systems can meet peak demand requirements. Such systems, however, can use large amounts of excess energy during non-demand situations. Thus, when the system does not provide assist to the brake system and/or steering system, it is common to reduce pump output during low demand conditions. However, when the system is required to provide brake assist and/or steering assist, it operates at a higher output level to assure availability of adequate braking assist.

One known approach for controlling such a system in a vehicle having stop-start engine capability uses detailed driver braking demand information to control the hydraulic pump. Specifically, the known system includes a brake-by-wire system, and uses brake sensor inputs that provide detailed information as to the level of brake actuation requested by the driver, such as the degree of driver depression.

However, the inventors herein have recognized several disadvantages of the above system. As one example, it relies on detailed brake information that may only be available on systems utilizing complex brake-by-wire systems, such as in hybrid vehicles having stop-start functionality. As another example, detailed brake information may be unavailable in some systems which may otherwise benefit from adjustable pump control to provide both braking and steering assist functions. As still another example, adding complex braking control or detailed sensor systems may undesirably increase system cost.

Thus, in one approach, at least some of the above issues may be addressed by a method to control a hydraulic pump of a vehicle, the pump coupled to at least a power steering system and a power braking system, the method comprising: measuring steering and braking information using a brake sensor and a steering sensor; and adjusting output of said hydraulic pump based on measured information from said sensors. For example, the method may use predicted pump demand to control a hydraulic pump and adjust output of said hydraulic pump based predicted pump demand using measured information from sensors.

In this way, it is possible to advantageously control the pump to generate appropriate flow rate to handle both steering and braking maneuvers, while also reducing parasitic losses without the need for additional sensors.

In another approach, a system for a vehicle having a power steering and a power brake system may be used. The system comprises: a pump coupled to at least the power steering and the power brake system; a brake switch sensor configured to indicate whether or not a brake pedal of the brake system is actuated by a vehicle operator; a hydraulic brake booster hydraulically coupled to the pump and mechanically coupled to the operator actuated brake pedal; a steering sensor coupled to the steering system; and a control system configured to adjust output of the pump in response to said brake switch sensor and said steering sensor.

In this way, it is possible to advantageously utilize a lower resolution brake sensor system having lower cost components, such as a hydraulic brake booster, while still providing appropriate control of a hydraulic pump that provides both steering and braking assist. For example, by utilizing both steering and brake sensor information, sufficient assist operation may be provided to the steering and braking systems when needed, while also reducing parasitic system losses when such assistance is not needed.

Note that various types of steering sensors may be used, such as steering angle, steering rate, steering torque, combinations thereof, and others. Further, various types of brake sensors may be used, such as a brake switch, a brake light switch, a brake pressure switch, combinations thereof, and others. The pump may be driven by an electric motor, driven by the engine (e.g., via the front end accessory drive, FEAD), combinations thereof, or others.

DESCRIPTION OF THE DRAWINGS

FIG. 1A is an exploded view illustrating the connections of the hydraulic braking system of FIG. 1.

FIG. 5A shows the brake sensor reading in the example of a brake switch sensor. FIG. 5B shows vehicle speed in miles per hour (MPH). FIG. 5C shows the absolute value of steering rate in degrees per second (Deg/s). FIG. 5D shows commanded pump speed as a percentage of a maximum pump speed command.

DETAILED DESCRIPTION

Figure 1:
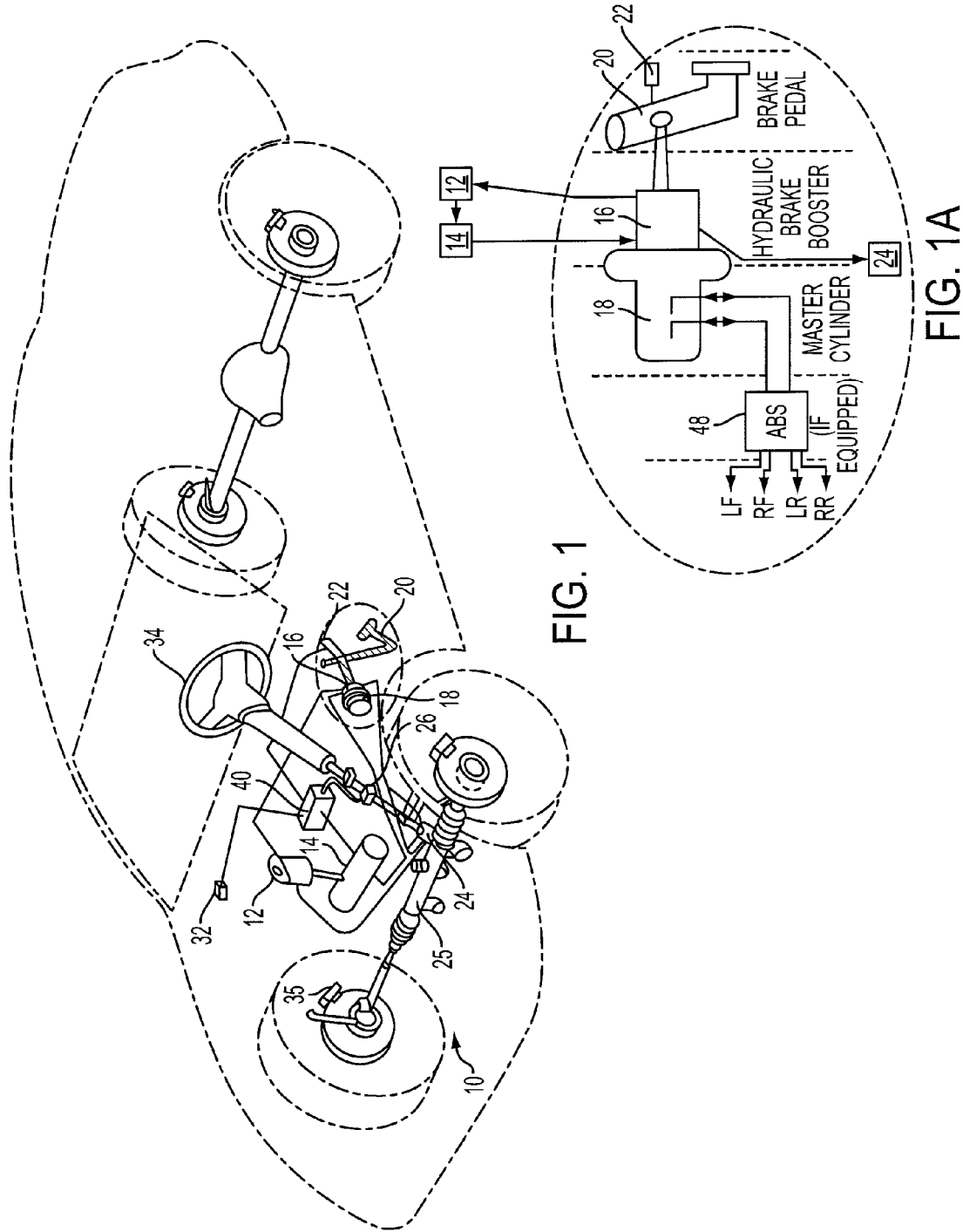
FIG. 1 is an exemplary diagrammatic perspective view of a vehicle with a power assisted steering and braking system.

FIG. 1 shows an exemplary diagrammatic perspective view of a vehicle with a power assisted steering and braking system. FIG. 1A is an exploded view illustrating the connections of the hydraulic braking system of FIG. 1. As will be described herein, the braking and steering systems may be hydraulically actuated via a common hydraulic system. Further, the hydraulic flow rate may be variably regulated depending on operating conditions of the vehicle, the steering system, and the braking system to improve performance while reducing parasitic losses. For example, under conditions where increased hydraulic assistance is needed, the hydraulic pressure or flow may be increased, whereas under conditions where decreased hydraulic assistance is needed, the hydraulic pressure or flow may be decreased. In this way, it is possible to provide sufficient steering and braking assistance when needed, while reducing use of excess energy under non-demand situations.

Continuing with FIG. 1, the depicted system 10 has a steering rack assembly 25 that is coupled to a steering wheel 34 to steer the vehicle in response to movement of the steering wheel 34. Alternatively, any suitable steering system may be used, including but not limited to parallelogram, recirculating ball type steering gears, and electronic variable orifice steering. It should also be noted that the hydraulic pump 14 can be driven by the engine, or alternatively by an electric motor.

Figure 2:
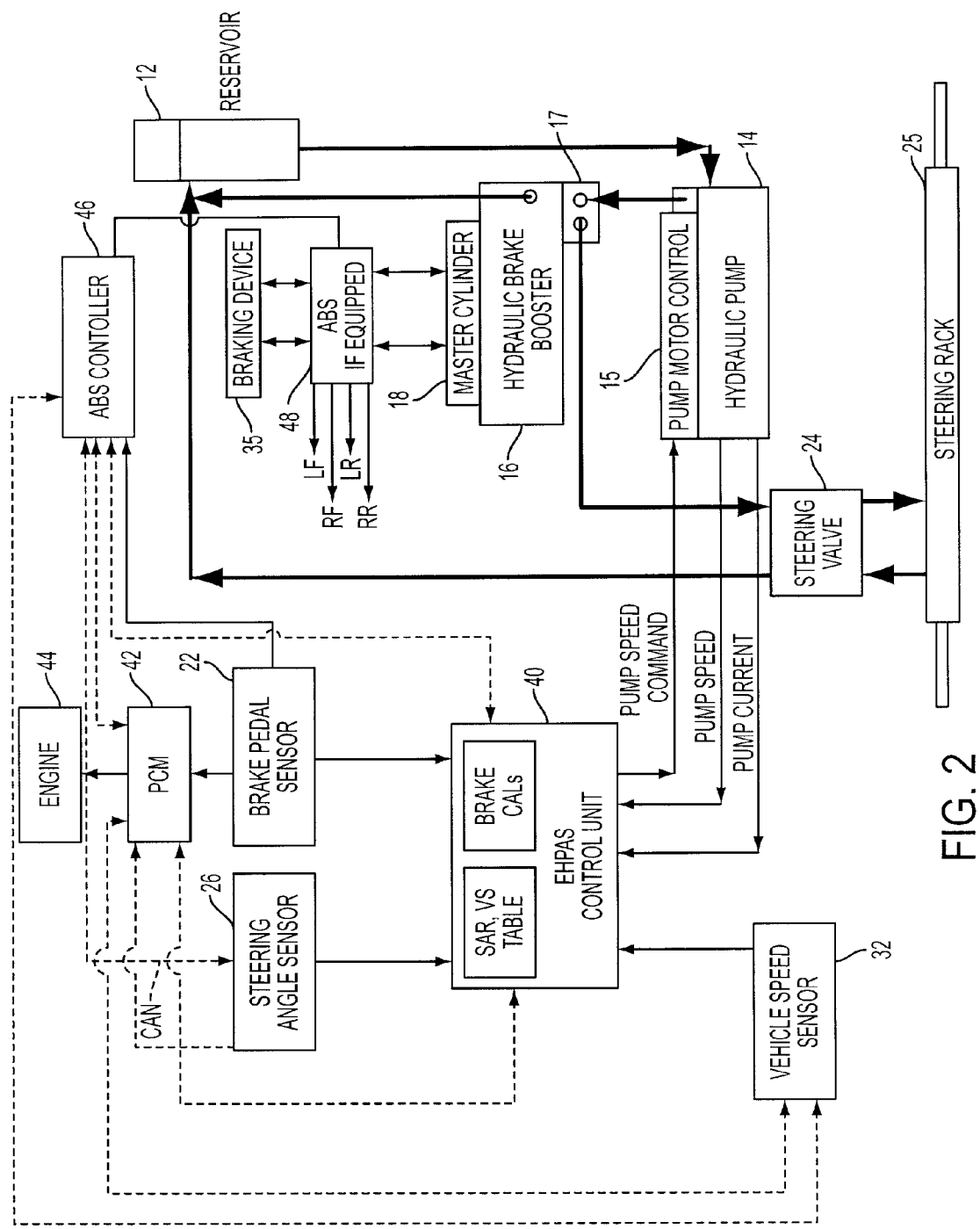
FIG. 2 is a block diagram illustrating additional details of the system of FIG. 1.

Referring to the exemplary embodiment depicted in FIGS. 1 and 2, the hydraulic brake booster 16 may be hydraulically coupled between the hydraulic pump 14 and the master cylinder 18. The braking device 35 is hydraulically coupled to the master cylinder 18. Such configuration makes use of hydraulic pressure from the hydraulic pump 14 and operates the master cylinder when the brake pedal 20 is applied. The braking device 35 is connected to at least one vehicle wheel which is capable of being brought into communication with an electronically controlled valve (not shown) arrangement in order to apply hydraulic fluid under pressure to the braking device 35. Braking device 35 may be any suitable device such as drum brakes, or disc brakes. Additionally, an anti-lock brake system (ABS) 48 may be coupled to the braking device. In one embodiment, ABS may be hydraulically coupled to master cylinder 18 and four wheel cylinders of the left front wheel, right front wheel, left rear wheel and right rear wheel.

Continuing with FIGS. 1 and 2, the reservoir 12 supplies fluid to the hydraulic pump 14 which supplies pressurized hydraulic fluid to the control valve 17 where the fluid splits to the steering and braking systems (FIG. 2 illustrates the example hydraulic circuit by the thick lines). In some embodiments, in one fluid conduit, the pressurized hydraulic fluid after control valve 17 is supplied to the hydraulic brake booster 16 which communicates with the master cylinder 18 to provide braking assist to braking device 35. The control valve 17 may be integrated within the housing of the hydraulic brake booster 16 or it may be separated from the housing of the hydraulic brake booster 16. In another fluid conduit, the controlled hydraulic fluid from the control valve 17 regulates the flow supplied to steering valve 24. The steering valve 24 meters fluid to the steering rack 25 in response to torque on the steering wheel thereby providing steering assist.

It should be appreciated that the example hydraulic circuit for the example steering and braking systems are for illustration purposes. Various other hydraulic circuits, steering systems, or braking systems may be used, if desired.

Referring now specifically to FIG. 2, control units coupled to the various sensors are shown for controlling the operation of the power assisted steering and braking system based on the demands from the steering and braking system. Sensors are used to detect, sense, or measure various vehicle operating conditions. Steering sensors may be used to detect the steering demand, and may include a steering angle sensor, a steering torque sensor, a steering angle rate sensor (or absolute value thereof), or combinations thereof.

To determine a braking assist demands, a brake sensor may be used. The brake sensor may be the brake pedal sensor 22 to detect the brake pedal activation, such as a brake pedal switch or a brake light switch coupled to a brake light. Alternatively, a brake pressure switch or brake position may be used to sense braking assist demands.

Additionally, a vehicle speed sensor 32 may be used as an input to further determine the hydraulic pump demand, or adjust a steering or braking demand determined via steering and/or braking sensors. In this way, a more accurate indication of hydraulic pump demand can be achieved. For example, as noted herein, during some vehicle speed conditions, increased hydraulic flow may be needed, whereas under other vehicle speed conditions, decreased hydraulic pressure may be needed. Vehicle speed sensor 32 may be any variety used to sense vehicle speed, such as a sensor not subject to wheel slip. For example, vehicle speed as determined from a non-driven wheel may be used. As another example, a signal generator driven by the powertrain of the vehicle may be used. Further still, vehicle speed as determined via a radar unit may also be used.

Information from vehicle speed sensor, steering sensor, and brake sensor are input into the electro-hydraulic power assisted steering (EHPAS) control unit 40 where the input data are processed. For example, the EHPAS control unit may include a table for steering angle, steering rate, and/or vehicle speed, and a brake calibration table. Parameters indicating the hydraulic pump conditions such as pump speed and pump current may be read into the EHPAS control unit. The command for pump speed determined by a control routine is then sent to the pump motor control 15 to regulate the hydraulic flow to the steering and braking system. One example of a control routine is illustrated in FIG. 3.

Continuing with FIG. 2, a powertrain control module (PCM) 42 may be linked to the brake pedal sensor 22 and the engine 44 of the vehicle. PCM 42 may communicate with EHPAS control unit 40 via a controller area network (CAN) represented by the dash lines in FIG. 2. Alternatively, the PCM and EHPAS controllers may be integrated/incorporated into one unit.

In some embodiments, an anti-lock brake system (ABS) 48 may be coupled to the braking system. A separate ABS controller 46 may be employed in the system to communicate with PCM 42 and EHPAS control unit 40. Alternatively, ABS controller 46 may be integrated/incorporated into PCM and/or EHPAS control unit. Brake sensor 22 may be electrically linked to ABS controller 46. Optionally, CAN may link hard wired sensors to controllers. For example, steering sensor 26 or vehicle speed sensor 32 may be linked to ABS controller 46 via CAN. In another example, steering angle sensor 26 or vehicle speed sensor may be linked to PCM via CAN.

Figure 3:
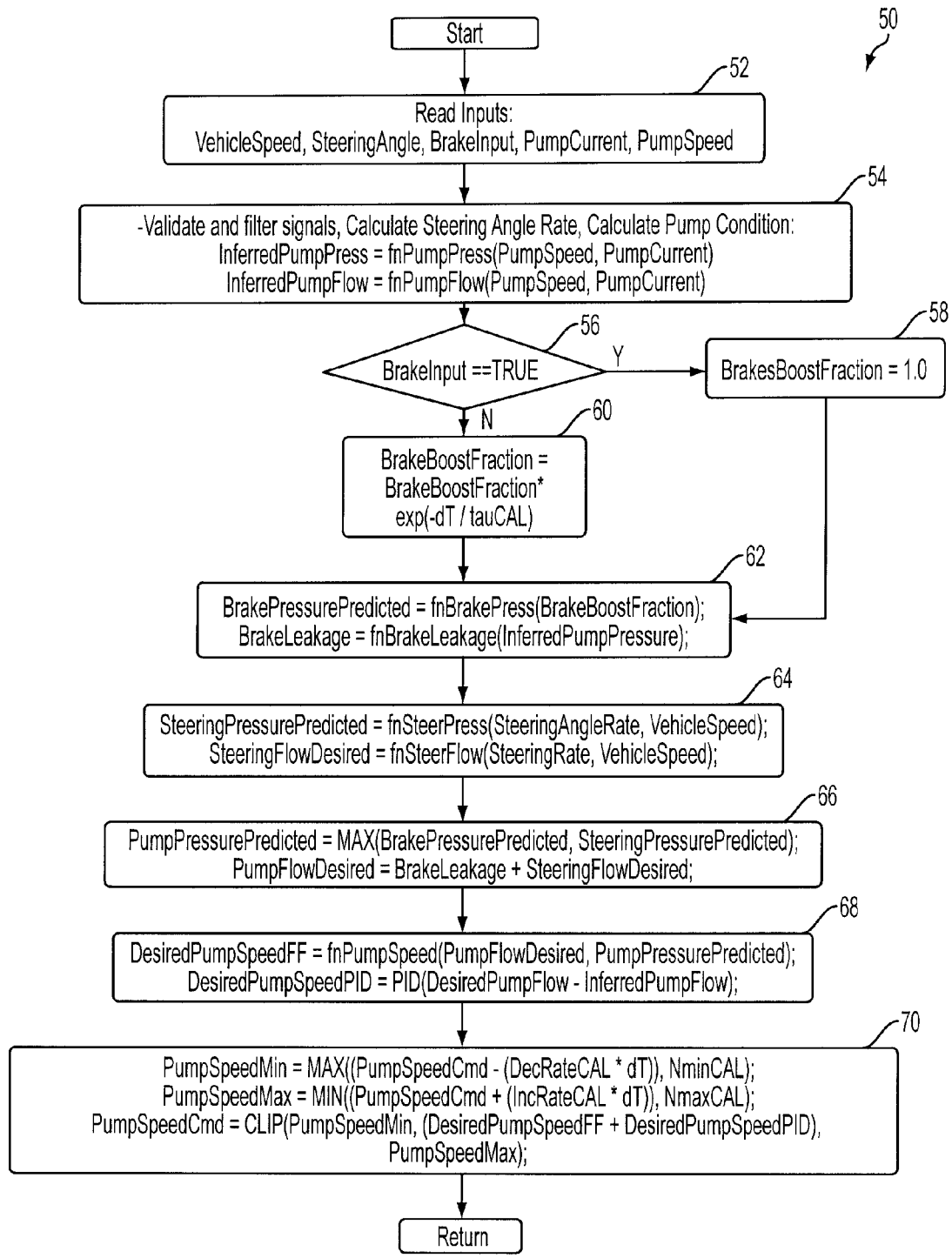
FIG. 3 is a flow diagram of an embodiment of a method for controlling a power assisted steering and braking system of a vehicle.

Referring now to FIG. 3, a flow diagram depicting an exemplary method to control an output of a hydraulic pump to assist steering and braking systems of a vehicle is generally shown at 50. Method 50 depicts a routine used for a hydraulic pump powered by an electric motor, e.g. an electro-mechanical hydraulic powered pump. The routine, in 52, first reads inputs from steering, braking, and pump systems. The inputs may be used to determine the demands for the steering and braking systems and thus the desired hydraulic flow from the pump to assist steering and braking. In some embodiments, steering wheel angle, steering wheel rate, and/or vehicle speed may be used to determine steering demands. Likewise, a brake pedal switch, brake light switch, brake pressure switch, brake pedal position, brake pressure, and/or brake pedal activation switch may be used to determine braking system demands. For example, a brake sensor may be directly coupled to a braking system so that the brake sensor detects a driver's input braking demand. In some embodiments, pump current and pump speed may also be read to determine the pump conditions.

In one particular embodiment, the brake sensor is a two position switch type sensor that only indicates whether or not the brakes are activated by the operator. Thus, the degree of braking may increase or decrease, yet the sensor output remains substantially unchanged. On the other hand, the sensor indicates whether or not the brake pedal is substantially released by the operator. Next, the routine, in 54, validates and filters signals, calculates steering angle rate, and calculates pump conditions. Pump conditions may include a pump pressure or pump flow. The pump pressure may be inferred from its relationship with pump speed and pump current using predetermined pump characteristics. Similarly, the pump flow may be inferred from pump speed and pump current using predetermined pump characteristics. Next, the routine, in 56, determines whether a brake input is on, or activated. If so, the routine sets a brake boost fraction to 1.0 in 58. Otherwise, the routine, in 60, filters the braking signal by determining the relationship between the brake boost fraction with time after the brake is off. In one embodiment, the new brake boost fraction equals the old brake boost fraction times exp(−dT/tauCAL), where T is time and tau is a time constant. In this way, the fraction can be filtered to provide a desired response to various excitation inputs. Next, in 62, predicted brake pressure is set to be a function of the brake boost fraction, and the brake leakage is set to be a function of inferred pump pressure. Various functions may be used, including either linear or non-linear relationships.

Next, the routine, in 64, determines the steering demand based on steering input information. For example, in one embodiment, predicted steering pressure may be a function of steering rate and vehicle speed. Similarly, desired steering flow from the hydraulic pump may be scheduled as a function of steering rate and vehicle speed.

Continuing with FIG. 3, the routine, in 66, determines a pump pressure according to the steering and braking demands. In one embodiment, the predicted pump pressure may be selected as the maximum value between the predicted brake pressure and predicted steering pressure. In another embodiment, the desired pump flow may be set to equal to the brake leakage plus the desired steering flow. Next, the routine, in 68, determines the desired pump speed via a feed forward (FF) control and/or a proportional, integral, and derivative (PID) control feedback control. In one embodiment of feedforward control, the desired pump speed may be anticipated as a function of desired pump flow and predicted pump pressure. In one embodiment of feedback control, the desired pump speed may be determined through feedback control based on the error between the desired pump flow and the inferred pump flow. Note that various alternative control architectures may be used, such as state-space control, non-linear control, sliding control, fuzzy control, or various others.

Next, the routine, in 70, determines the required pump speed by modifying and adopting changes over time. For example, the minimum pump speed may be selected to be the maximum of two values: (1) (pump speed commanded minus calibrated decreased rate multiplied by an interval of time), and (2) a minimum calibrated speed. The maximum pump speed may be the minimum of two values: (1) (commanded pump speed plus calibrated increased rate multiplied by an interval of time), and (2) the maximum calibrated speed. Then, the commanded pump speed may be determined by clipping the following values: the minimum pump speed, (desired pump speed FF plus desired pump speed PID), and the maximum pump speed.

According to the above operation, it is possible to appropriately control the pump to provide sufficient hydraulic operation under varying steering and braking condition, while also reducing parasitic losses. Further, it is possible to provide such operation even with lower resolution brake sensor information.

Note that while FIG. 3 shows one example routine, various modifications may be made. For example, the routine of FIG. 3 illustrates an example routine for an electric motor driven pump. However, as noted herein, the pump may be driven by the engine. In such an example, the routine may be modified and different pump operating parameters may be used. For example, pump pressure and flow may be determined based on alternative parameters, such as engine speed. Further, a sensor may be installed in the engine driven pump to determine load on the pump and pump pressure. Also, pump flow may be controlled to regulate hydraulic flow to the steering and braking systems instead of controlling or adjusting the pump speed in the engine driven pump example.

Figure 4:
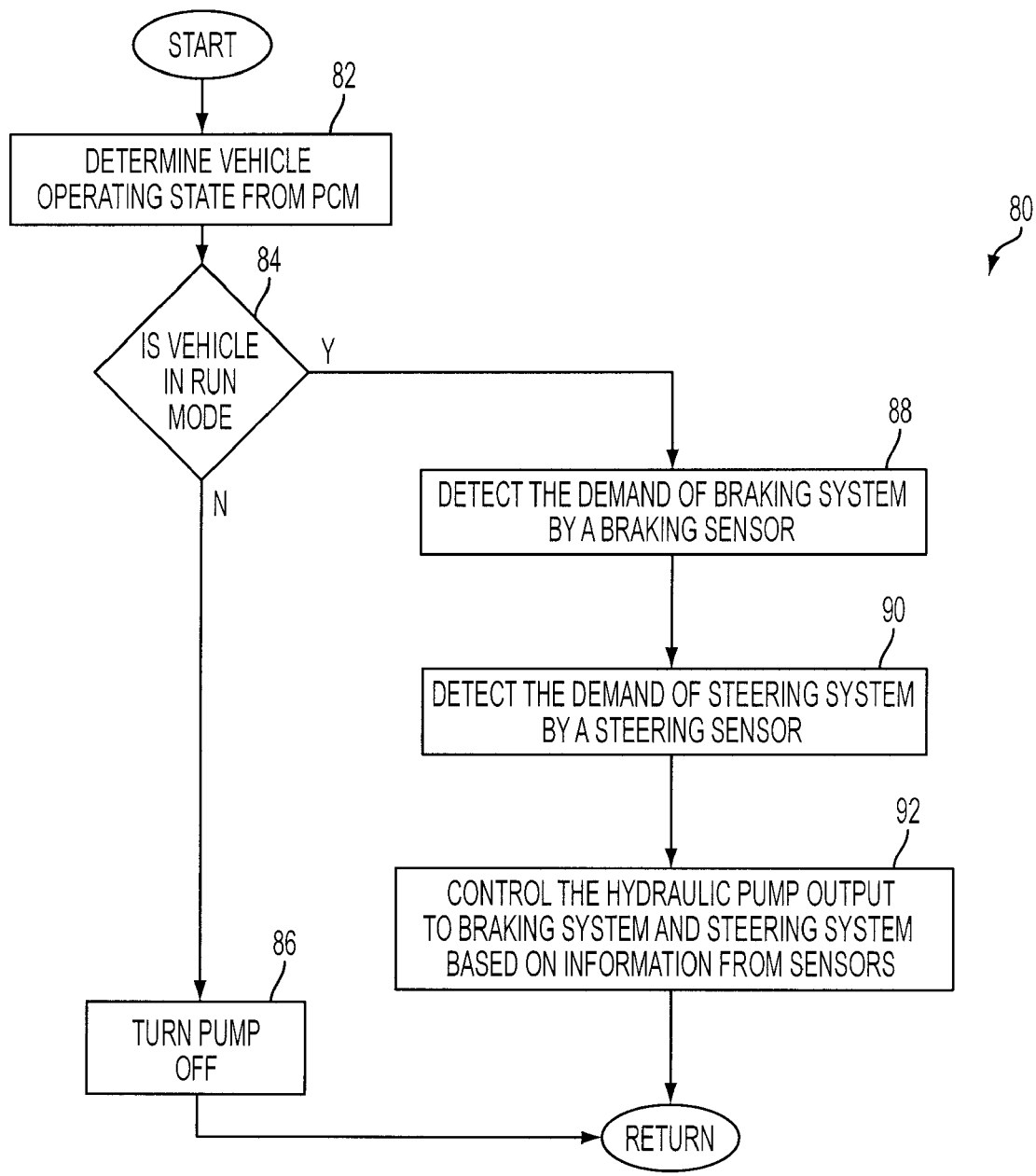
FIG. 4 is a flow diagram of an embodiment of a method to control a power assisted steering and braking system.

FIG. 4 shows a flow diagram of an embodiment of a method to control a power assisted steering and braking system. The routine 80 generally depicts a method to control the output of a hydraulic pump coupled to the steering and braking system. First, the routine determines the vehicle operating state from PCM in 82. Then, the routine determines whether the vehicle is in run mode in 84. If the answer is no, the pump is turned off in 86. Otherwise, the routine continues to step 88. The routine detects the demand of braking system by a braking sensor in 88 and detects the demand of steering system by a steering sensor in 90. Some examples of the steering and braking sensors are described above. Any suitable steering sensors and braking sensors may be used to detect the demands of the steering and braking demands.

It should be noted that additional inputs such as vehicle operating conditions may be combined with the braking and steering inputs to accurately determine the braking and steering demands. The control routine 50 in FIG. 3 describes some exemplary parameters indicative of vehicle conditions (vehicle speed for example). It should be appreciated that any suitable parameters indicative of vehicle conditions and/or engine conditions may be served as inputs for a control routine.

Continuing with FIG. 4, the routine, in 92, controls the hydraulic pump output to braking system and steering system based on information from sensors. The control may be implemented using the control routine 50 depicted in FIG. 3. Alternatively, various modifications to the control routine 50 may be employed to control the output of the hydraulic pump.

Figure 5:
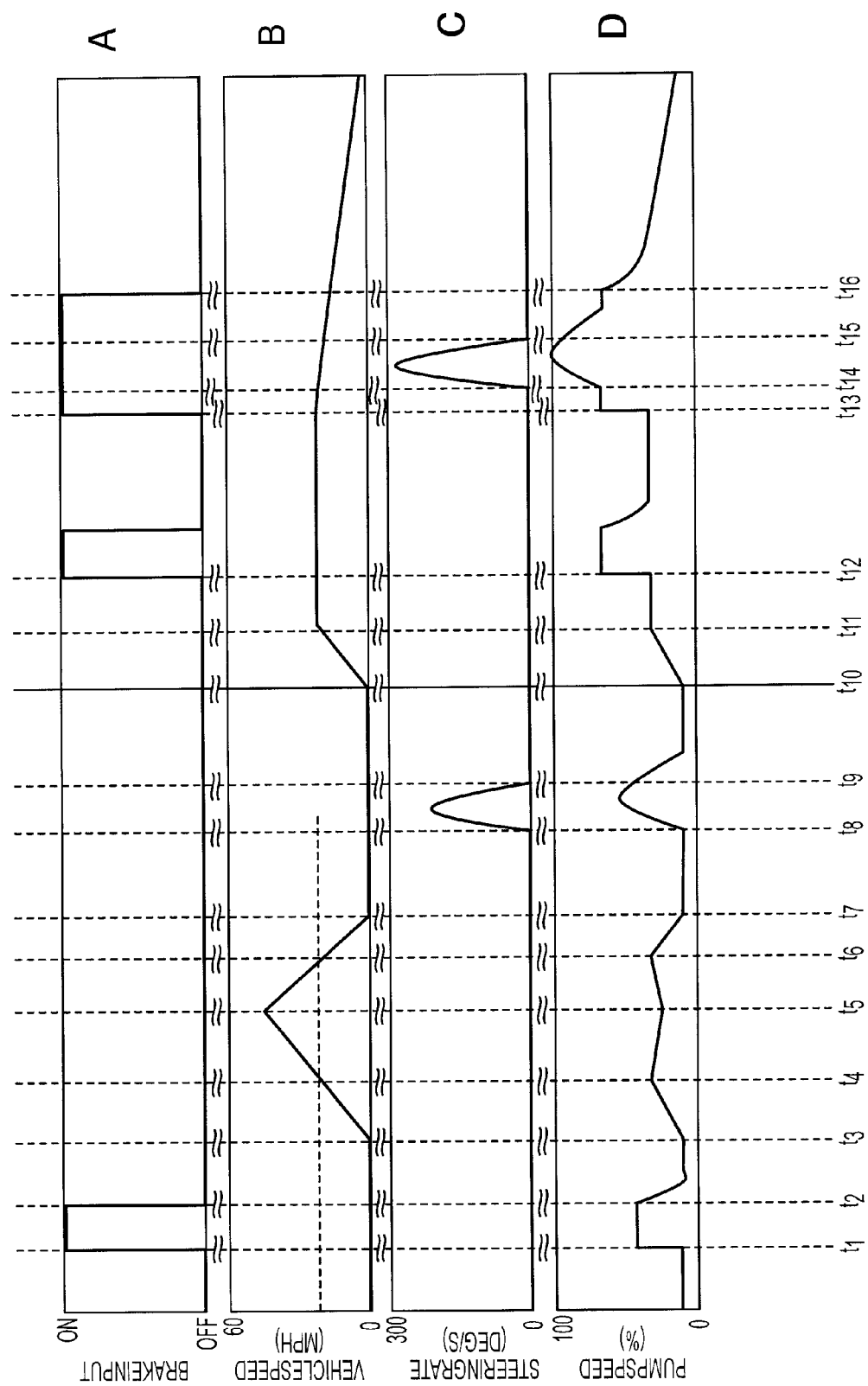
FIG. 5 is a prophetic example of operation according to FIG. 3.

FIG. 5 is a prophetic example of operation of a combined steering and braking system according to FIG. 3. FIG. 5A shows the brake sensor reading in the example of a brake switch sensor. FIG. 5B shows vehicle speed in miles per hour (MPH). FIG. 5C shows absolute value of steering rate in degrees per second (Deg/s). FIG. 5D shows commanded pump speed as a percentage of a maximum pump speed command.

Continuing with FIG. 5A, it shows that the brake is activated by the operator from time t1 to time t2. At this period, the vehicle speed and the steering rate are zero as shown in FIGS. 5B and 5C, respectively. In response to the braking demand, the speed of the hydraulic pump determined by the routine 50 changes in a pattern similar to the brake input as shown in FIG. 5D. However, the pump speed does not drop to the baseline level at t2 when the brake is off. Instead, the filtering noted herein enables the pump command to gradually decay in a way described in step 60 of the routine 50. Thus, pump speed decreases exponentially and then is kept at the baseline level at a point between from t2 to t3.

At the time period from t3 to t7, vehicle speed increases linearly and then decreases linearly to zero. In response to the changes, pump speed increases with increasing vehicle speed at lower vehicle speeds, but then decreases for increasing vehicle speeds at high vehicle speeds. This approach may provide the desired steering feel for the vehicle and provide enough flow to meet the demands of a sudden steering input. The pump speed verses vehicle speed curve may vary depending on the vehicle type and desired steering feel. From t8 to t9, steering angle rate or steering rate (degree per second) increases to a value and then decreases to zero as shown in FIG. 5C. As shown in FIG. 5D, pump speed responds to the steering demand in a pattern similar to the changes of steering demand. Again, the steering input is filtered and pump speed gradually decreases to the baseline level after t9 when the steering rate drops to zero. From t10 to t12, pump speed raises from the baseline in response to the increased vehicle speed.

From t12 to t13, pump speed increases in response to the braking demand and then gradually decreases after the braking is off and then is kept at a constant value until t13. Since the vehicle is moving, more braking effort is needed to slow down the vehicle. Thus, the higher pump output is required to assist braking than when vehicle is stopped.

Continuing with FIG. 5, from t13 to t16, there is a again an engaged brake condition. As noted above, the braking effort may be variable, and may differ from the previous braking events, however, such information is not provided via the sensor of FIG. 5A. In this period from t14 to t15, steering is also demanded as indicated by the peak of the change of the steering rate. In response to both steering and breaking demands, pump speed increases in similar way as described above for the separate demand for braking or steering. From t13 to t14, pump speed increases only to respond to the braking demand. Then, from t14 to t15, pump speed increases in response to both braking and peak steering demands. Pump speed increases 100% at the time close to peak steering demand that occurs also during braking demands. From t15 to t16, pump speed decreases gradually to a value corresponding to braking demand. After t16 when braking is off, pump speed decreases gradually as the vehicle speed decreases.

The control method described above has various advantages. For example, the method uses inputs from both braking and steering systems to control the output of a hydraulic pump to meet demands during peak usage and to reduce energy usage during non-peak time. As illustrated in FIG. 5, pump output is controlled in response to and to follow the changes of steering and braking demands. Since an efficient operating point for a combined power braking and steering system may be selected, energy (parasitic) losses may be lowered and vehicle efficiency may be increased. Further, the method may be implemented in a vehicle equipped with a braking system utilizing a hydraulic brake booster. For example, additional sensors may not be required since it is possible to utilize lower resolution braking sensors in combination with steering sensors, and vehicle sensor that may already be equipped in the vehicle.

As will be appreciated by one of ordinary skill in the art, the specific routines and block diagrams described above in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controllers.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various steering and brake input sensors and pump plumbing and control methods, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of pump control methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method to control a hydraulic pump of a vehicle, the pump coupled to at least a power steering system and a power braking system, the method comprising:
   measuring steering and braking information using a brake sensor and a steering sensor; and
   adjusting an output speed of said hydraulic pump based on measured information from said sensors, the output speed of said hydraulic pump being a pump speed and the hydraulic pump driven by an electric motor;
   wherein adjusting the output speed includes increasing the pump speed as a vehicle speed and/or steering rate increases and a brake is activated, and decreasing the pump speed as the vehicle speed decreases and the brake is deactivated.

2. The method of claim 1 wherein the brake sensor measures a two-state brake pedal input.

3. The method of claim 1 wherein the brake sensor measures a brake pressure.

4. The method of claim 1 wherein the steering sensor measures a steering angle rate.

5. The method of claim 1 further comprising measuring the vehicle speed from a vehicle speed sensor, and adjusting said output speed of the pump based on said measured vehicle speed.

6. The method of claim 5 further comprising increasing the pump speed as the vehicle speed increases during a first condition, and decreasing the pump speed as the vehicle speed increases during a second condition.

7. A system for a vehicle having a power steering and a power brake system, comprising:
   a pump coupled to at least the power steering and the power brake system;
   a brake switch sensor configured to indicate activation and deactivation of a brake pedal of the brake system by a vehicle operator;
   a brake light coupled to and activated by the brake switch sensor;
   a hydraulic brake booster hydraulically coupled to the pump and mechanically coupled to the driver actuated brake pedal;
   a steering sensor coupled to the steering system;
   a vehicle speed sensor; and
   a control system configured to adjust output speed of the pump in response to said brake switch sensor, said steering sensor, and said vehicle speed sensor, the control system further configured to increase pump output speed in response to activation of a brake or increase in a steering angle rate, and decrease pump output speed in response to deactivation of the brake or decrease in the steering angle rate, where said increase in pump output speed is at a faster rate than said decrease in pump output speed.

8. A method, comprising:
controlling an electric motor-driven hydraulic pump coupled to a vehicle's power steering system and power braking system; and
adjusting output speed of said hydraulic pump by adjusting the electric motor based on driver braking actuation, steering angle, and vehicle speed, said adjusting including increasing the pump speed as the vehicle speed increases based on a first condition, and decreasing the pump speed as the vehicle speed increases based on a second condition.

9. A method to control a hydraulic pump of a vehicle, the pump coupled to at least a power steering system and a power braking system, the method comprising:
measuring steering and braking information using a brake sensor and a steering sensor; and
adjusting an output speed of said hydraulic pump based on measured information from said sensors, the output speed of said hydraulic pump being a pump speed and the hydraulic pump driven by an electric motor,
wherein adjusting the output speed includes increasing the pump speed as a vehicle speed and/or steering rate increases and a brake is activated, and decreasing the pump speed as the vehicle speed decreases and the brake is deactivated, and
wherein the increasing the pump speed further includes:
increasing the pump speed at a first rate as the vehicle speed increases and the brake is activated;
increasing the pump speed at a second, different from the first, rate as the steering rate increases and the brake is activated; and
increasing the pump speed at a third, different from the first and second, rate as the vehicle speed and steering rate increase and the brake is activated.

10. The method of claim 6 further comprising increasing the pump speed as the vehicle speed decreases during a third condition, and decreasing the pump speed as the vehicle speed decreases during a fourth condition.

* * * * *